INVENTOR.
WILLIAM R. PODHAJSKY
BY
ATTORNEY.

March 12, 1968 W. R. PODHAJSKY 3,372,821
SPARE TIRE HOLDER

Filed Feb. 21, 1966 2 Sheets-Sheet 2

INVENTOR.
WILLIAM R. PODHAJSKY
BY
ATTORNEY.

United States Patent Office 3,372,821
Patented Mar. 12, 1968

3,372,821
SPARE TIRE HOLDER
William R. Podhajsky, Rte. 2,
Toledo, Iowa 52342
Filed Feb. 21, 1966, Ser. No. 528,974
10 Claims. (Cl. 214—451)

ABSTRACT OF THE DISCLOSURE

A winch type spare tire holder for mounting under a pickup truck frame and having winch controls accessible at the rear of the vehicle. A lock system is provided for the controls and the winch attachment to the spare tire is sealed against tampering. It has a brake device to control attaching and releasing the spare tire relative to the holder.

This invention relates to improvements in spare tire holders and more particularly to such holders as are used on pickup trucks.

While spare tires are sometimes carried in a side mount on pickup trucks, it is more common to find them supported in aa bracket mounted under the rear frame portion of the vehicle. Such brackets generally secure the tire by bolts and nuts or other means requiring the application of a wrench or the like to remove the tire and thus it can be appreciated that this can be and is a rather arduous task. The latches or securing devices on spare tire holders of this type are exposed to mud and dirt during travel and consequently are usually difficult to remove. In addition, the removal of the tire requires a person to crawl under the vehicle in order to reach the tire and this is most unpleasant at any time and especially in bad weather. Another disadvantage of such tire mounts is the fact that the tire is quite susceptible to thievery unless a special lock means is provided which is generally not the case.

With the above observations in mind, one of the important objects contemplated by this invention is the provision of an improved spare tire hilder designed more particularly for pickup trucks which, while mounted to the rear frame portion of the vehicle below the bed, includes means accessible preferably from the rear of the vehicle for easy and quick removal of the tire from the holder or attachment thereto.

Another object herein is to provide a spare tire holder as characterized which can be tightened or loosened by the standard tire removal tool with which all vehicles are usually equipped.

A further object of this invention is to provide a spare tire holder of the above class which includes means for raising and lowering the tire relative to a frame mounted bracket and the ground and which, in attaching a tire to the bracket, can be applied to the tire when the tire is out from under the vehicle.

Still another object is to provide such a raising and lowering means that is not only shielded from dirt and mud but is also, for all practical purposes, adequate protection against thievery.

Another object includes a simple but effective locking means disposed preferably at the rear of the vehicle to prevent tampering with and unauthorized operation of the raising and lowering device.

A further object is to provide a novel braking apparatus for use with the tire raising and lowering means to prevent any accidental slippage.

Other objects are to provide a spare tire holder as set forth which is economical to manufacture, simple and convenient to use, and exceedingly efficient for its intended purpose.

Figure 1:
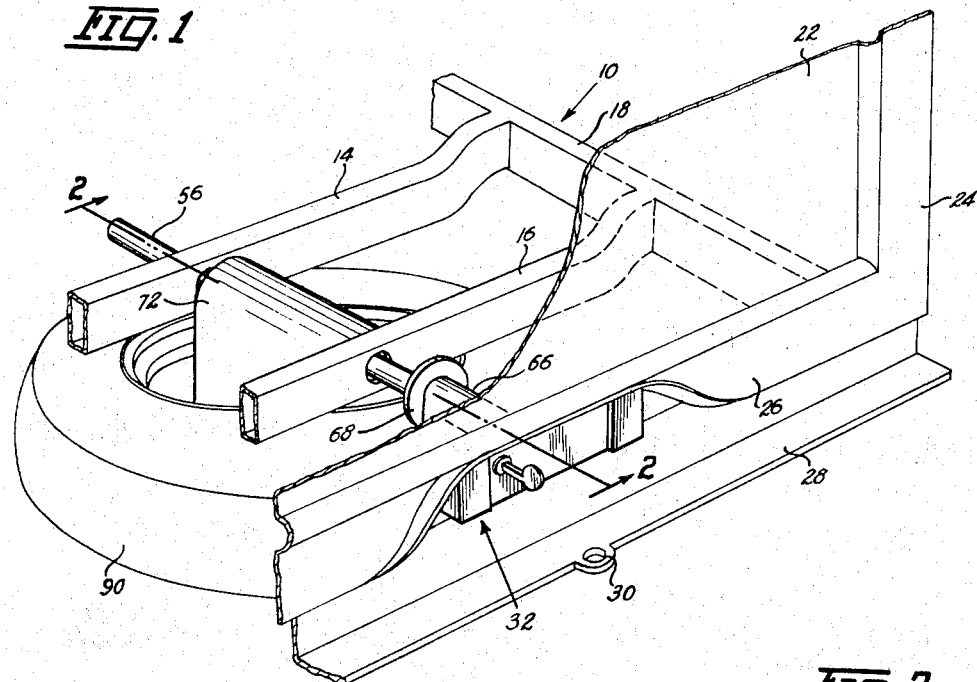
Figure 2:
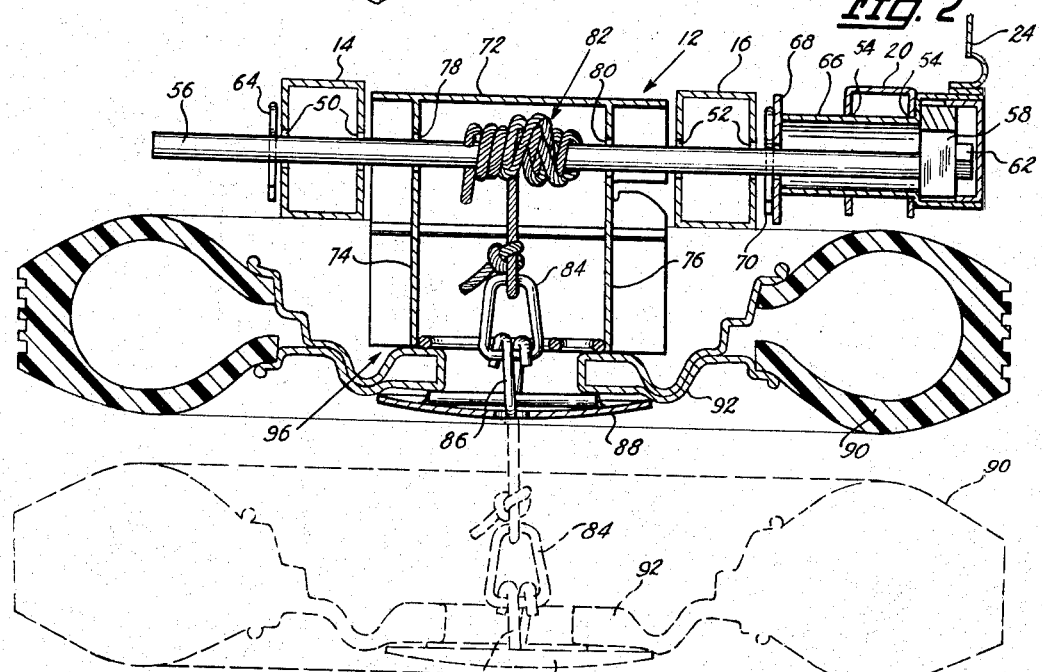

To attain these objects and such further objects as may appear herein, or be hereinafter pointed out, reference is made to the accompanying drawings forming a part hereof, in which:

FIG. 1 is a perspective view of a preferred embodiment of this spare tire holder shown in place relative to the rear frame portion of a pickup truck, FIG. 2 is a cross sectional view taken on the line 2—2 of FIG. 1 with the solid line position representing the tire securely in place and the broken line position showing the tire lowered to ground level.

Figure 3:
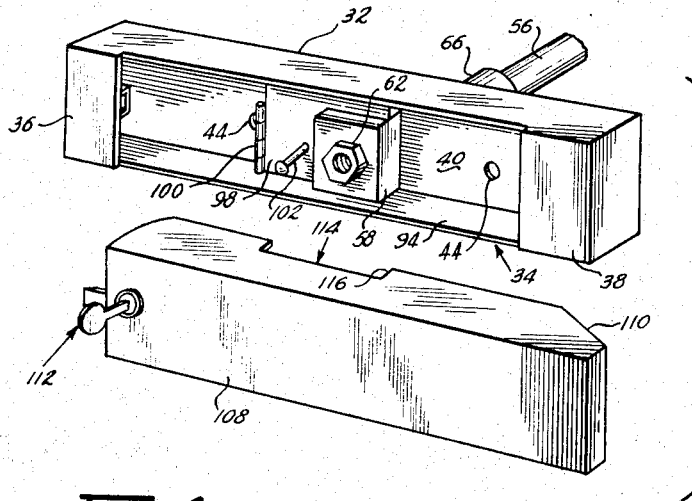
Figure 4:
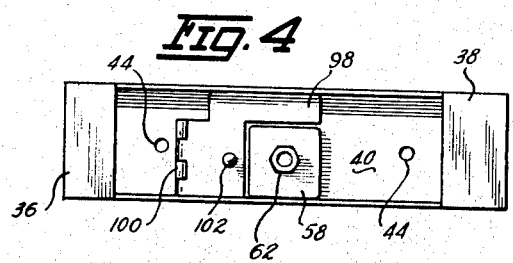
Figure 5:
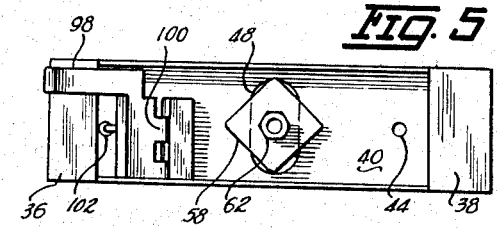
Figure 6:
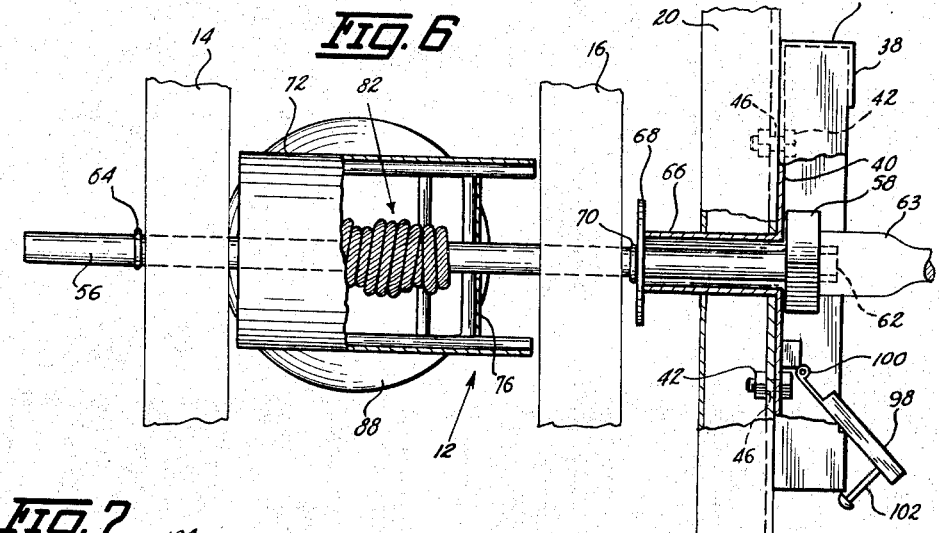
Figure 7:
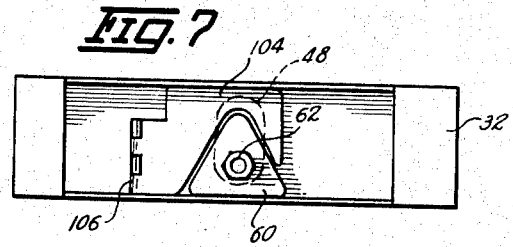

FIG. 3 is an exploded perspective view of a housing and locking mechanism associated with this holder which is preferably mounted at the rear of the vehicle, FIG. 4 is an elevational view of the locking mechanism in locked position, FIG. 5 is similar to FIG. 4 but showing the unlocked position, FIG. 6 is a top plan view of this holder partly cut away to more clearly illustrate the construction thereof, and FIG. 7 is an elevational view of the locking device generally similar to FIG. 4 showing a slight modification thereof.

Referring to the drawings, sufficient of the rear frame portion of a pickup truck chassis is shown generally at 10 in FIG. 1 to illustrate the environment in which this spare tire holder 12 is used and such frame may include one or more cross bars such as 14 and 16 that are secured to side rails in spaced parallel relationship as shown at 18. Bars 14 and 16 represent frame members located forwardly of the rear cross frame member 20. the endgate 22 of the vehicle (not shown) is secured to frame portion 24 of the vehicle body in a well known manner. Numeral 26 designates trim portion of the body below the endgate 22. The bumper 28 with an eye 30 for a hitch is shown but forms no part of this invention.

This new spare tire holder 12 comprises an elongated housing 32 (FIG. 3) that is preferably substantially square in cross section and is open on one side as at 34 over its major length intermediate the respective end wall portions 36 and 38. The closed side 40 of housing 32 is secured to the rear side of the vehicle frame member 20 by means of bolts and nuts 42 (FIG. 6) through the holes 44 in side 40 and drilled holes 46 in frame 20. Preferably, holder 12 is mounted in the rear center portion of the vehicle as seen in FIG. 1 and trim 26 can be bent as shown if it is not already formed as shown for a license plate for example, in such case such a plate can be placed elsewhere at the rear.

A vertically elongated slot or opening 48 is provided in the longitudinal center portion of housing side 40 and planar with opening 48 and in registration therewith are the respective openings 50, 52 and 54 in the respective frame members 14, 16 and 20 as best seen in FIG. 2.

A rod 56 which serves as a winch means as will appear, is rotatably journalled through openings 48, 50, 52 and 54 and carries a rigidly attached multi-sided block 58 shown as square in FIG. 3 or as three-sided 60 in FIG. 7 on one end whereby such block will be within housing 32 as shown. Rod 56 projects slightly from block 58 or 60 and carries a rigidly attached hex nut 62 of the standard size used to attach vehicle wheels to the axle mountings so that nut 62 can be engaged by a standard tire tool 63 with which vehicles are customarily equipped. All of the slots 48, 50, 52 and 54 are oversized relative to the diameter of rod 56 to permit the vertical movement of such rod relative thereto as will later be referred to in more detail.

A removable cotter pin 64 is inserted through rod 56 just forwardly of cross bar 14 to prevent accidental withdrawal of rod 56 and a sleeve 66 is secured at one end to housing 32 so as to enclose rod 56 intermediate cross frame bars 16 and 20 as best seen in FIGS. 2 and 6. Sleeve 66 serves to keep dirt out of housing 32 and includes a washer 68 fitted snugly on its forward end to rod 56 with a second cotter pin 70 inserted through rod 56 intermediate flange 68 and cross bar 16.

Rod 56 passes rotatably through an open bottom housing 72 shown here as in inverted U shaped member which is disposed intermediate cross bars 14 and 16 as best seen in FIG. 2 and includes apertured spaced end walls 74 and 76 through which rod 56 passes. Such apertures 78 and 80 are also oversized relative to rod 56 the same as openings 48, 50, 52 and 54. A flexible cable, rope, cord or chain member designated by the numeral 82 is anchored at one end to rod 56 intermediate housing walls 74 and 76 so that it can be wound and unwound thereon by rotation of rod 56 as will appear and the other end of member 82 carries a suitable ring means 84 removably engageable with a hook 86 that is secured to a dished disk plate 88. A spare tire is designated by he numeral 90 and shown mounted to a wheel 92. Thus far described, this tire holder will operate in the following manner.

In initially mounting the spare tire to holder 12, it is pointed out that the tire can be placed on the ground at the rear of the vehicle where it is convenient to handle and need not be placed directly under the holder 12 or under the vehicle. Cord 72 is unwound by rotating the hex nut 62 counterclockwise with an ordinary tire tool 63 and as this is done, block 58 (or 60) are secured to rod 56. To accommodate the rotation of block 58, rod 56 is elevated in slot 48 as well as in openings 50, 52 and 54 as is apparent. Normally, such rotation and elevation of rod 56 will be accomplished intermittently as the tire tool 63 is removed and replaced on nut 62 and thus each time the tool is removed, block 58 (or 60) will come to rest on the bottom side 94 of housing 32 (FIG. 3) where, by reason of the flat sided perimeter of such block and the weight of the wheel and tire, it will be appreciated that no accidental rotation of rod 56 can occur.

With cord 82 fully unwound, ring 84 is passed through the axial opening in wheel 92 and engaged with hook 86 with disk 88 being on the outside of a wheel similarly positioned and similarly sized as a hub cap. Nut 62 is then rotated clockwise until the dished center portion of wheel 92 is tightly abutting the lower end 96 of housing 72 as seen in the solid lines of FIG. 2. During this winding up process, the intermittent resting of block 58 (or 60) on housing surface 94 acts as a brake to hold the tire and wheel from dropping back to the ground and thus greatly facilitates the ease with which the tire can be elevated into place. Removal of the tire is accomplished by reversing the procedure described wherein the braking function of block 58 (or 60) will be appreciated. With the tire secured as described, it is seen in FIG. 2 in the solid lines that cord 82 is completely encased within housing 72 as protection against thievery at this point. Further locking and braking means are provided on housing 32 as follows.

With reference more particularly to FIGS. 3–5, an inverted L-shaped lock plate 98 in hingedly secured as at 100 to side 40 of housing 32 so that in its closed or locked position as seen in FIG. 4, it is abutting the block 58 on two sides to not only keep it from rotating but also to keep from being moved vertically and with plate 98 so arranged, rod 56 cannot be rotated from beneath the vehicle, for example. A handle 102 is provided on plate 98 for swinging it outwardly away from block 58 as seen in FIG. 5. In FIG. 7, plate 104 which is similarly arranged relative to side 40 by hinges 106 is shown as notched to fit the triangular shape of block 60 and serves the same purpose as plate 98 described above. A removable cover 108 for housing 32 which serves also as a locking means is in the form of an elongated bar seen in FIG. 3 that is bevelled, 110 at one end and is provided at the opposite end with a lock means 112 for locking engagement with housing wall 36. Cover 108 is provided with the transverse notch 114 intermediate its ends and thus arranged, the bevelled end 110 is inserted into housing 32 behind wall 38 and the lock end 112 is lockably engaged with wall 36. In this position, block 58 is recessed within notch 114 so as to be abutted by cover 108 on two opposite sides. A key type lock is shown at 112 but any suitable means such as a padlock, for example, may be utilized if desired. By reason of the notch 114 abutting opposite sides of block 58, cover 108 will not only effectively serve as a locking means against rotation of said block but also acts on lock plate 98 to prevent it from swinging outwardly and thus supplements the locking action of plate 98 to provide a double lock protection. By use of cover 108 it will be appreciated that rod 56 cannot be removed rearwardly even with pins 64 and 68 removed and cannot be removed forwardly with such pins removed because of block 58 so that in fully locked position, holder 12 is relatively safe from tampering.

While in the above description, rod 56 has been shown mounted through cross bars 14, 16 and 20, it is pointed out that this rod can be attached above or below such bars and that housing 32 could be easily mounted at the side of the vehicle chassis rather than at the rear without in any way departing from the principles herein disclosed. It is also pointed out that this device may be mounted to a passenger vehicle by any skilled mechanic. Thus, from the foregoing, it is thought a full understanding of construction and operation of this invention will be had and the advantages of the same will be appreciated.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:
1. In a holder for a wheel mounted spare tire for use on a vehicle chassis, said holder comprising:
   winch means mounted to said chassis and removably connected to the wheel of a spare tire,
   manually operable means for operating said winch means, and
   a removable lockable cover removably interconnected with said manually operable means to render it inoperable and also serving to prevent access thereto.
2. A spare tire holder as defined in claim 1 wherein: said winch means includes
   means on said chassis supporting a rotatable rod,
      a flexible member windable and unwindable on said rod by its rotation in respective opposite directions,
      a plate engageable with the outer side of the wheel,
      means detachably connecting one end of said flexible member through the axial opening in said wheel from the inside to said plate, and
   said manually operable means serving to selectively rotate said rod in different respective directions whereby said wheel can be selectively lowered to ground level and elevated so that the tire on the wheel tightly abuts the underside of said housing.
3. A holder as defined in claim 2 including:
   an open bottom housing,
   said rod being rotatably journaled through said housing,
   said flexible member being disposed within the confines of said housing, and
   the bottom of said housing abuts the inner side of said wheel in its elevated position whereby said flexible member and its end attached to said plate is covered and closed to access thereto.

4. A holder as defined in claim 2 including:
a housing mounted to the rear side of said chassis and having a closed bottom side and an open rear side, said housing having a vertically elongated slot,
said first bar having a slot in registration with the slot in said housing,
said rod being extended into said housing through said slots,
a multi-sided block secured to said rod within said housing so that one side normally rests on the bottom of said housing to prevent accidental rotation of said rod,
means on said block to receive an ordinary tire changing tool whereby said rod can be manually rotated thereby,
said slots serving to permit the elevation of said rod and block to accommodate the rotation of said block with said rod, and
the engagement of said block with the bottom of said housing at any time during the rotation of said rod serving as a brake means against further rotation of said rod in any direction.

5. A holder as defined in claim 4 including:
a plate hingedly secured to said housing,
said plate having a configuration so as to embrace at at least the top side of said block when it is resting on the bottom of said housing, and being movable into and out of embracing relationship therewith, and
said plate when embracing said block serving as a lock means against accidental elevation thereof.

6. A holder as defined in claim 4 including:
a plate hingedly secured to said housing,
said plate having a configuration so as to embrace at least two sides of said block when it is resting on the bottom of said housing, and being movable into and out of embracing relationship therewith, and
said plate when embracing said block serving as a lock means against accidental elevation thereof and also against accidental rotation thereof.

7. A holder as defined in claim 6 wherein:
said removable cover is lockably attached to said housing so as to enclose said block, and
means on said removable cover engaging said plate to prevent its accidental movement away from embracing relationship with said block.

8. A holder as defined in claim 7 wherein said removable cover abuts one side of said block to serve as stop means to prevent the accidental rotation of said block.

9. A holder as defined in claim 4 wherein said removable cover is lockably attached to said housing so as to abut one side of said block to serve as a stop means to prevent the accidental rotation of said block.

10. A holder as defined in claim 2 wherein said plate is similarly designed and similarly positioned as a hub cap relative to said wheel so as to completely seal access to the connection of the flexible member thereto.

References Cited

UNITED STATES PATENTS

| 1,983,767 | 12/1934 | Mueller | 214—451 X |
| 2,131,746 | 10/1938 | Morrison | 214—451 |
| 2,775,358 | 12/1956 | Renouf | 214—451 |

FOREIGN PATENTS

| 327,659 | 4/1930 | Great Britain. |

HUGO O. SCHULTZ, *Primary Examiner.*